United States Patent [19]

Norman

[11] 4,444,400
[45] Apr. 24, 1984

[54] SEAL ASSEMBLIES AND CORRUGATED METAL PACKER MEMBERS THEREFOR

[75] Inventor: William S. Norman, Braddan, Isle of Man

[73] Assignee: National Research Development Corporation, London, England

[21] Appl. No.: 254,103

[22] Filed: Apr. 14, 1981

[30] Foreign Application Priority Data

Apr. 22, 1980 [GB] United Kingdom ............... 8013231

[51] Int. Cl.³ .................... F16J 15/08; F16L 19/06
[52] U.S. Cl. ...................................... 277/9; 277/213; 277/236; 285/39; 285/109; 285/346; 285/DIG. 18
[58] Field of Search ................. 285/18, 23, 31, 39, 285/109, 141, 145, 146, 346, DIG. 4, DIG. 18; 277/1, 9, 9.5, 200, 213, 236

[56] References Cited

U.S. PATENT DOCUMENTS

| 926,841 | 7/1909 | Bartlett | 277/213 X |
|---|---|---|---|
| 1,030,055 | 6/1912 | Darlington | 277/213 |
| 1,856,581 | 5/1932 | Mitchell | 277/9 X |
| 1,897,648 | 2/1933 | Stehr | 277/213 |
| 2,356,947 | 8/1944 | Pranger et al. | 277/200 X |
| 3,033,290 | 5/1962 | Brown | 277/9 X |
| 3,160,416 | 12/1964 | Ryffel | 277/1 |
| 3,332,566 | 7/1967 | Phillips | 277/213 X |

Primary Examiner—Robert S. Ward
Attorney, Agent, or Firm—Oblon, Fisher, Spivak, McClelland & Maier

[57] ABSTRACT

A packer member including a plurality of corrugated rings, particularly for sealing the annular clearance between the casing and tubing of an oil well. The packer is carried upon a collar presented by a member coupled into the tubing, and axial compression of the packer flattens the corrugations, expanding the rings radially so that such tightly fit with the inner wall of the casing by either penetrating it or being distorted against the inner wall, and at the same time the axial compression makes a tight fit between the inner edges of the rings and the collar on which they are supported. The packer may include a stack of corrugated rings alternately positioned with rings of harder and softer materials, and occasional robust rings may add stability.

3 Claims, 8 Drawing Figures

SEAL ASSEMBLIES AND CORRUGATED METAL PACKER MEMBERS THEREFOR

BACKGROUND OF THE INVENTION

1. Field of the Invention:

This invention relates to sealing members, especially for use as packings to seal and block the space between the inner wall of a hollow cylindrical pipe and the outer wall of a pipe of smaller diameter located coaxially within it. The invention relates particularly to oil and other wells of the common type in which the well casing, extending from the well head down to the oil reservoir formation, is a long cylindrical pipe in the form of a string of many pipe sections screwed together. Within the casing is a second pipe string of similar length but of smaller diameter which is generally known as tubing. The tubing services to conduct the fluids produced by the well to the well head but may also serve to conduct fluids being injected into the well. To prevent these fluids from entering into the annular space between the tubing and the casing a device called a packer member is commonly employed. The packer typically comprises a hollow cylindrical member inserted into or mounted upon the tubing by a coupling, and supporting a packing ring of a flexible elastomeric material, which is compressed against the inner wall of the casing to form a tight joint.

2. Description of the Prior Art:

In some applications a well may be used to inject steam or hot water into an oil-bearing formation in order to increase the fluidity of the oil and cause it to flow to neighboring wells, where it is produced. Alternatively, the steam may be injected for a short period and oil subsequently produced through the same well. The steam is injected down the tubing and a packer may be used to prevent the steam from entering the annulus between the tubing and the casing. However, typical elastomeric packing rings are not suitable for use with steam at high temperatures and pressures.

SUMMARY OF THE INVENTION

The present invention results from a search for a more suitable seal, and according to it a sealing member comprises a ring formed with corrugations whose height dimension lies in a direct parallel to the ring axis, so that flattening these corrugations causes the outer diameter of the ring to increase; preferably the axes of the corrugations lie in substantially radial directions relative to the ring axis, the member is made of metal and the corrugations extend over the full radial extent of the ring from its outer to its inner edge.

According to the present invention also, a packer for use in oil or other wells may comprise a hollow cylindrical member which can be joined to the tubing string by means of a coupling and which carries around its outer surface one or preferably a plurality of the corrugated rings described above. The rings may be held between two collars, one of which is fixed to the cylindrical member and the other is free to slid along it. The outer diameter of the rings in the corrugated state may be such that the assembly can slide freely inside the well casing, and to form a joint between the packer and the casing, the sliding collar may be forced against the corrugated rings in such a manner as to flatten them and cause their diameters to increase until they come in contact with the inner wall of the casing with sufficient force to form a tight, fixed, joint, the rings being held between the fixed and sliding collars with sufficient force to form tight joints with the cylindrical member also. Resilient gaskets may be interposed between the rings and the collars to assist in forming tight joints.

In one form of the invention a member for use as an oil well packer may comprise a stack of corrugated rings possibly cut from sheet metal but preferably machined from a solid metal. The rings may be made of a metal which is softer than that of the well casing, so that when their diameter has been increased by flattening the outer edges of the rings deform to conform to the wall of the casing. Alternatively the rings may be made of a hard metal capable of penetrating any surface defects on the inner wall of the casing, or the stack may consist of rings of softer metal interspersed with rings of hard metal.

To help resist any tendency for the rings to buckle under load when the corrugations are flattened, a stack of rings as already described may also include at least one robust ring of maximum diameter slightly less than the internal diameter of the outer casing; preferably several such robust rings are distributed at axial intervals among the other rings.

As a further alternative there may be several coaxial sealing members, each comprising a stack of rings and spaced axially apart from each other and separated by sliding collars.

The degree of corrugations of a ring may be such that the effective outer diameter of the ring rises by say 4 or 5% when the corrugations are fully flattened.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
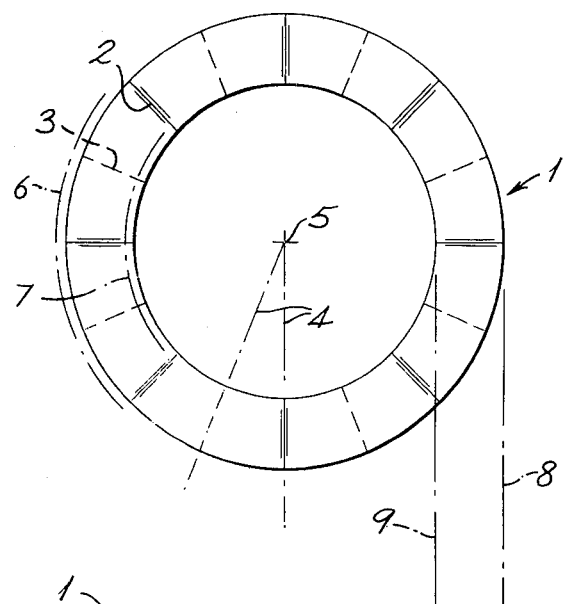
FIG. 1 is a plan view of a corrugated ring.
Figure 2:
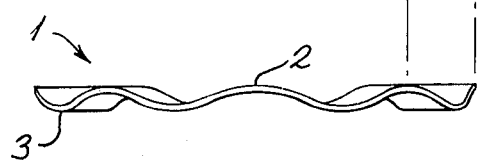
FIG. 2 is an elevation of the same ring.

FIGS. 1 and 2 show a sealing member in the form of a single corrugated ring 1 that has been machined from solid metal. The corrugations present crests 2 and troughs 3, the axes 4 of the corrugations lying radially relative to the centre 5 of the ring. Lines 6 and 7 indicate the extremities of the outer and inner diameters of ring 1 when flat, before the corrugations were formed, and it will be observed that the effective outer and inner diameters of the corrugated ring, indicated by lines 8 and 9, are both less than the corresponding quantity for the flat ring. If the corrugated ring is subjected to axial compression so that the corrugations are flattened to some degree, the outer diameter of the ring will increase. Therefore if a corrugated ring fits an annular cavity with slight clearance, and if the ring is then axially compressed so that its outer diameter increases, the outer edge of the ring will expand and either penetrate the outer wall of the cavity or deform against it, according to whether the ring is of harder or softer material than that wall. In either case the ring edge will make firm contact with the wall.

Figure 3:
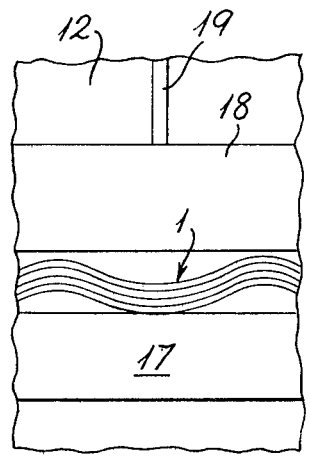
FIG. 3 is a radial view of part of a packer when in place but inoperative.
Figure 4:
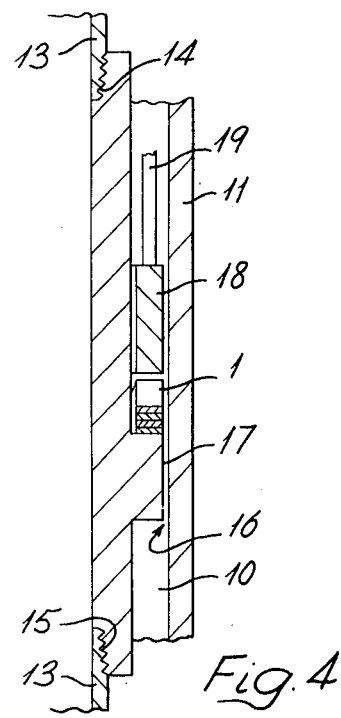
FIG. 4 is part of a radial section through the packer shown in FIG. 3.

FIGS. 3 and 4 show an oil well packer comprising several rings 1, held together axially in a stack. The rings are shown in the fully-corrugated condition and the outer diameter of the member therefore corresponds with that indicated by the line 8 in FIGS. 1 and 2. A stack of rings of this outer diameter just fits into the annular space 10 between the outer casing 11 and a hollow cylindrical member 12 inserted into the tubing 13 by screwed couplings 14 and 15, leaving a small gap 16 between the outer edges of the rings and the inner surface of casing 11. The rings rest on the upper surface of a collar 17 fixed to the member 12. A collar 18, which makes an easy sliding fit over member 12, is inserted into space 10 from the top after the rings and comes to rest on the upper surface of the top ring. A piston 19, driven by means not shown, is addressed to the upper surface of collar 18.

Figure 5:
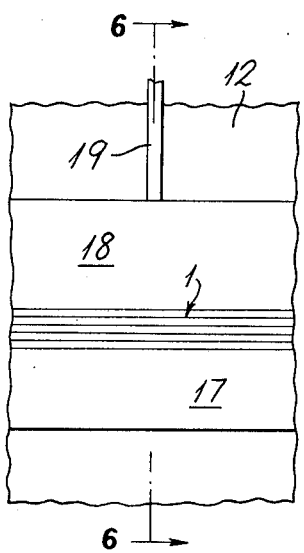
FIG. 5 is a radial view of part of the packer shown in FIGS. 3 and 4 but when operative.
Figure 6:
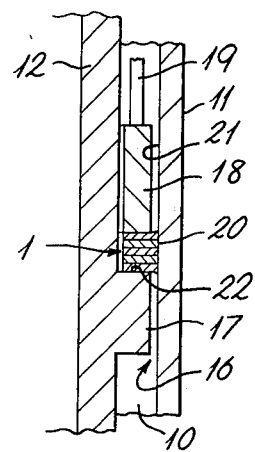
FIG. 6 is part of a radial section taken along line 6—6 through the operative packer shown in FIG. 5.

FIGS. 3 and 4 thus show a sealing member in position ready to operate, but as yet inoperative. FIGS. 5 and 6 show the same member in operation, effecting a seal. Piston 19 has descended under power, driving collar 18 downwards so as to shorten the axial space between collars 17 and 18 and to flatten the corrugations of rings 1. The outer diameter of the rings therefore increases, by an amount greater than the radial extent of gap 16. The tips 20 of rings 1 therefore meet the inner surface 21 of casing 11, and because in this instance the material of rings 1 is less hard than that surface the tips 29 deform so as to conform to and press tightly against the surface 21, thus making a seal. Another seal is made between the flattened lower surface of the lowest ring and the upper surface 22 of fixed collar 17 and the stack of rings 1 now forms a complete seal across the annular space 10.

From FIGS. 3 and 4 it will have been seen that while the rings remain in their corrugated state their outer edges lie nearly flush with the outer edge of fixed collar 17 and are thus protected by it. When the rings are flattened they may typically project an extra ⅛" radially, so that they grip the casing.

Figure 7:
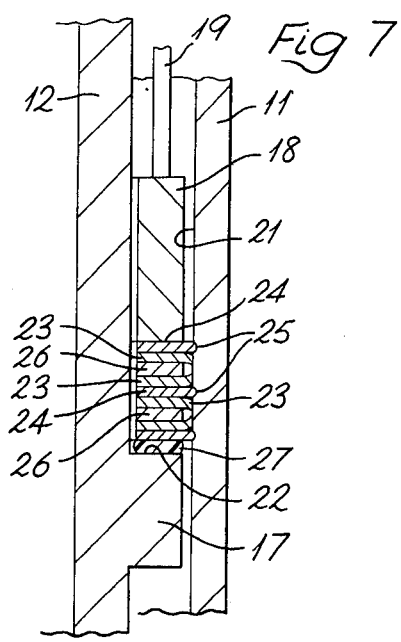
FIG. 7 is a similar section through another packer when operative.

FIG. 7 shows another sealing member in its operative position. This member includes rings 23 which are similar to the rings 1 of FIGS. 3 and 6 in that they are made of material softer than the inner surface 21 of casing 11. However this sealing member also includes rings 24, initially similar in shape but of harder material than surface 21, so that when they increase in outer diameter due to compression by piston 19 and collar 18 their tips 25 tend to penetrate into surface 21 instead of bending and conforming to it. The member also includes more robust rings 26 which are shorter in outer diameter so that they never come into contact with surface 21; these rings serve to keep the stack of rings 23, 24 orderly and to prevent the rings from buckling when axial force is applied by piston 19. The stack also includes a resilient ring gasket 27 to improve the seal between the base of the stack and face 22 of fixed collar 17; such a gasket could with advantage be located in an annular recess in the upper face 22 of collar 17, so as to protect it from stresses imposed during flattening of the rings.

In practice the penetration of hard rings into the casing would be microscopic, and cannot clearly be illustrated in a drawing. The true action of such rings is probably to penetrate hard scale or imperfections on the wall.

Figure 8:
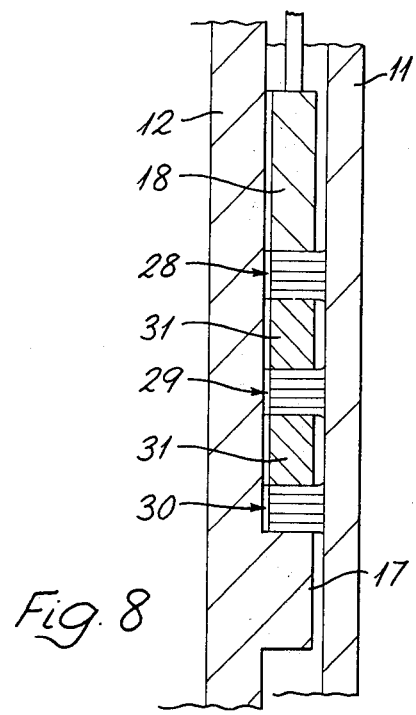
FIG. 8 is a similar section through yet another packer when operative.

FIG. 8 shows a sealing member comprising three stacks 28-30, separated one from the other by sliding collars 31. The essential elements of each of the stacks 28-30 may be as shown in FIGS. 3 to 6, for example.

One typical application proposed for the invention is for sealing the annular space between the tubing and outer casing of a well in which the casing has an outside diameter of 7.0", an inner diameter of 6.184" and a weight of 29 lbs per foot. The tubing has an outside diameter of 2.875", an inside diameter of 2.323" and a weight of 7.90 lb per foot. For such a casing size the drift diameter, that is to say the diameter of the largest cylinder which can pass freely through it, is 6.059". The maximum diameter of the packer with the sealing rings in their corrugated form, is no greater than 6.059" and may conveniently be 6.000". The diameter of rings when flattened but unrestrained by the casing is 6.250", the difference between this diameter and the inner diameter of the casing being taken up by compression and deformation when the rings are expanded inside the casing. On the assumption that each ring is initially corrugated with twelve troughs and twelve crests (instead of eight as shown in FIGS. 1 and 2) the outer peripheral distance between the successive crests is 1.56" and the axial distance between the troughs and crests is of the order of 0.25". Although in the examples of the invention already described the outer edge of the rings have been deformed or have penetrated the casing in their operating position, and the corrugations of the rings have been completely flattened, the invention also includes seals in which the outer edges of the rings make adequate sealing contact with the casing wall without significant penetration of deformation, and members which when fully compressed retain some degree of corrugation over their entire radial depth, so that surface 22 and/or gasket 27 needs to be formed with a complementary profile to make the necessary seal.

Obviously, numerous modifications and variations of the present invention are possible in light of the above teachings. It is therefore to be understood that within the scope of the appended claims, the invention may be practiced otherwise than as specifically described herein.

What is claimed as new and described to be secured by Letters Patent of the United States is:

1. A seal assembly for first and second sections that are relatively stationary when sealed, said assembly comprising:
    a first casing section;
    a second tubing section located coaxially within said first casing section and forming a clearance therebetween, said first casing section having an inner wall;
    a cylinder member coupled to said second tubing section and presenting an axially-facing surface;
    a packer member supported on said surface wherein said packer member further comprises at least one ring coaxial with said first and second sections and formed with a plurality of corrugations, axes of said corrugations lying in substantially radial directions relative to the axis of the at least one ring and wherein height dimensions of said corrugations lie in directions parallel to the axis of said at least one ring, said at least one ring having in a corrugated state an outer diameter such that said at least one ring is freely slidable within said first casing section; and means for compressing said packer member in an axial direction such that said outer diameter of said at least one ring increases and forms a tight joint against said surface and against said inner wall of said first casing section and said second tubing section is held stationary with respect to said first casing section.

2. A seal assembly according to claim 1 wherein said cylinder member further comprises a first collar and said means for compressing said packer member further comprises a second, movable collar.

3. A seal assembly according to claim 1, wherein said at least one ring in an uncompressed state further comprises a plurality of corrugated rings stacked coaxially.

* * * * *

UNITED STATES PATENT AND TRADEMARK OFFICE
CERTIFICATE OF CORRECTION

PATENT NO. : 4,444,400
DATED : April 24, 1984
INVENTOR(S) : William S. Norman

It is certified that error appears in the above-identified patent and that said Letters Patent is hereby corrected as shown below:

Column 1, line 46, change "direct" to --direction--.

Column 2, line 28, change "corrugations" to --corrugation--.

Column 3, line 38, change "tips 29" to --tips 20--.

Signed and Sealed this

Fifteenth Day of April 1986

[SEAL]

*Attest:*

DONALD J. QUIGG

*Attesting Officer*

*Commissioner of Patents and Trademarks*